US008264357B2

(12) United States Patent
Kato (10) Patent No.: US 8,264,357 B2
(45) Date of Patent: *Sep. 11, 2012

(54) WIRELESS IC DEVICE

(75) Inventor: Noboru Kato, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/429,346

(22) Filed: Apr. 24, 2009

(65) Prior Publication Data

US 2009/0201156 A1 Aug. 13, 2009

Related U.S. Application Data

(63) Continuation of application No. PCT/JP2008/061442, filed on Jun. 24, 2008.

(30) Foreign Application Priority Data

Jun. 27, 2007 (JP) .................................. 2007-168625
Sep. 27, 2007 (JP) .................................. 2007-232844

(51) Int. Cl.
*G08B 13/14* (2006.01)

(52) U.S. Cl. .................................. 340/572.7; 340/572.5

(58) Field of Classification Search .... 340/572.1–572.9, 340/10.1–10.6, 568.1, 540, 500; 257/531, 257/679, 737; 235/492; 343/860, 793
See application file for complete search history.

(56) References Cited

U.S. PATENT DOCUMENTS

| 3,364,564 A | 1/1968 | Kurtz et al. |
|---|---|---|
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |

(Continued)

FOREIGN PATENT DOCUMENTS

EP  0 694 874 A2  1/1996

(Continued)

OTHER PUBLICATIONS

English translation of NL9100176, published on Mar. 2, 1992.

(Continued)

*Primary Examiner* — Jennifer Mehmood
*Assistant Examiner* — Brian Wilson
(74) *Attorney, Agent, or Firm* — Keating & Bennett, LLP (57) ABSTRACT

A wireless IC device includes an electromagnetic coupler module including a wireless IC chip processing transmission and reception signals, and a feeder circuit board. In the wireless IC device, a first coupler defining a feeder circuit arranged on the feeder circuit board is electromagnetically coupled with a first mount of a first radiation plate, and a second coupler is electromagnetically coupled with a second mount of a second radiation plate. The couplers are respectively defined by line electrodes. Input and output terminal electrodes of the wireless IC chip are electrically connected to the line electrodes. The wireless IC chip is operated by the first and second couplers in response to a signal received by first and second radiation plates. A response signal from the wireless IC chip is radiated to the outside from the first and second radiation plates via the first and second couplers.

20 Claims, 10 Drawing Sheets

U.S. PATENT DOCUMENTS

| | | | |
|---|---|---|---|
| 5,757,074 A | 5/1998 | Matloubian et al. | |
| 5,903,239 A | 5/1999 | Takahashi et al. | |
| 5,936,150 A | 8/1999 | Kobrin et al. | |
| 5,955,723 A | 9/1999 | Reiner | |
| 5,995,006 A | 11/1999 | Walsh | |
| 6,104,311 A | 8/2000 | Lastinger | |
| 6,107,920 A | 8/2000 | Eberhardt et al. | |
| 6,172,608 B1 | 1/2001 | Cole | |
| 6,181,287 B1* | 1/2001 | Beigel | 343/741 |
| 6,190,942 B1 | 2/2001 | Wilm et al. | |
| 6,259,369 B1 | 7/2001 | Monico | |
| 6,271,803 B1 | 8/2001 | Watanabe et al. | |
| 6,335,686 B1 | 1/2002 | Goff et al. | |
| 6,362,784 B1 | 3/2002 | Kane et al. | |
| 6,367,143 B1 | 4/2002 | Sugimura | |
| 6,378,774 B1 | 4/2002 | Emori et al. | |
| 6,406,990 B1 | 6/2002 | Kawai | |
| 6,448,874 B1 | 9/2002 | Shiino et al. | |
| 6,462,716 B1 | 10/2002 | Kushihi | |
| 6,542,050 B1 | 4/2003 | Arai et al. | |
| 6,600,459 B2 | 7/2003 | Yokoshima et al. | |
| 6,634,564 B2 | 10/2003 | Kuramochi | |
| 6,664,645 B2 | 12/2003 | Kawai | |
| 6,763,254 B2 | 7/2004 | Nishikawa | |
| 6,828,881 B2 | 12/2004 | Mizutani et al. | |
| 6,927,738 B2 | 8/2005 | Senba et al. | |
| 6,963,729 B2 | 11/2005 | Uozumi | |
| 7,088,307 B2 | 8/2006 | Imaizumi | |
| 7,112,952 B2 | 9/2006 | Arai et al. | |
| 7,119,693 B1 | 10/2006 | Devilbiss | |
| 7,129,834 B2 | 10/2006 | Naruse et al. | |
| 7,248,221 B2 | 7/2007 | Kai et al. | |
| 7,250,910 B2 | 7/2007 | Yoshikawa et al. | |
| 7,276,929 B2 | 10/2007 | Arai et al. | |
| 7,317,396 B2 | 1/2008 | Ujino | |
| 7,405,664 B2 | 7/2008 | Sakama et al. | |
| 7,500,610 B1* | 3/2009 | Hadley et al. | 235/451 |
| 7,551,141 B1* | 6/2009 | Hadley et al. | 343/700 MS |
| 2002/0011967 A1 | 1/2002 | Goff et al. | |
| 2002/0044092 A1 | 4/2002 | Kushihi | |
| 2002/0067316 A1 | 6/2002 | Yokoshima et al. | |
| 2002/0171591 A1* | 11/2002 | Beard | 343/702 |
| 2003/0020661 A1 | 1/2003 | Sato | |
| 2004/0001027 A1 | 1/2004 | Killen et al. | |
| 2004/0066617 A1 | 4/2004 | Hirabayashi et al. | |
| 2004/0217915 A1 | 11/2004 | Imaizumi | |
| 2004/0219956 A1 | 11/2004 | Iwai et al. | |
| 2004/0227673 A1 | 11/2004 | Iwai et al. | |
| 2005/0092836 A1 | 5/2005 | Kudo | |
| 2005/0093677 A1* | 5/2005 | Forster et al. | 340/10.1 |
| 2005/0099337 A1 | 5/2005 | Takei et al. | |
| 2005/0125093 A1 | 6/2005 | Kikuchi et al. | |
| 2005/0140512 A1 | 6/2005 | Sakama et al. | |
| 2005/0232412 A1 | 10/2005 | Ichihara et al. | |
| 2005/0236623 A1 | 10/2005 | Takechi et al. | |
| 2005/0275539 A1 | 12/2005 | Sakama et al. | |
| 2006/0001138 A1 | 1/2006 | Sakama et al. | |
| 2006/0038257 A1* | 2/2006 | Anzai | 257/531 |
| 2006/0043198 A1* | 3/2006 | Forster | 340/572.7 |
| 2006/0044769 A1 | 3/2006 | Forster et al. | |
| 2006/0055601 A1 | 3/2006 | Kameda et al. | |
| 2006/0071084 A1 | 4/2006 | Detig et al. | |
| 2006/0109185 A1 | 5/2006 | Iwai et al. | |
| 2006/0145872 A1 | 7/2006 | Tanaka et al. | |
| 2006/0158380 A1 | 7/2006 | Son et al. | |
| 2006/0170606 A1 | 8/2006 | Yamagajo et al. | |
| 2006/0267138 A1 | 11/2006 | Kobayashi | |
| 2007/0004028 A1 | 1/2007 | Lair et al. | |
| 2007/0018893 A1 | 1/2007 | Kai et al. | |
| 2007/0040028 A1 | 2/2007 | Kawamata | |
| 2007/0052613 A1 | 3/2007 | Gallschuetz et al. | |
| 2007/0164414 A1 | 7/2007 | Dokai et al. | |
| 2007/0210923 A1* | 9/2007 | Butler et al. | 340/572.8 |
| 2007/0252700 A1 | 11/2007 | Ishihara et al. | |
| 2007/0285335 A1 | 12/2007 | Bungo et al. | |
| 2008/0024156 A1 | 1/2008 | Arai et al. | |
| 2008/0087990 A1 | 4/2008 | Kato et al. | |
| 2008/0143630 A1 | 6/2008 | Kato et al. | |
| 2008/0169905 A1 | 7/2008 | Slatter | |
| 2008/0272885 A1 | 11/2008 | Atherton | |
| 2009/0002130 A1 | 1/2009 | Kato | |
| 2009/0108993 A1* | 4/2009 | Forster | 340/10.1 |
| 2011/0063184 A1 | 3/2011 | Furumura et al. | |

FOREIGN PATENT DOCUMENTS

| | | |
|---|---|---|
| EP | 0 977 145 A2 | 2/2000 |
| JP | 50-143451 A | 11/1975 |
| JP | 62-127140 U | 8/1987 |
| JP | 03-262313 A | 11/1991 |
| JP | 04-150011 A | 5/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 07-183836 A | 7/1995 |
| JP | 08-056113 A | 2/1996 |
| JP | 8-87580 A | 4/1996 |
| JP | 11-149537 A | 6/1996 |
| JP | 08-176421 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-245381 A | 9/1997 |
| JP | 09-252217 A | 9/1997 |
| JP | 09-270623 A | 10/1997 |
| JP | 9-512367 A | 12/1997 |
| JP | 10-069533 A | 3/1998 |
| JP | 10-505466 A | 5/1998 |
| JP | 10-171954 A | 6/1998 |
| JP | 10-293828 A | 11/1998 |
| JP | 11-039441 A | 2/1999 |
| JP | 11-085937 A | 3/1999 |
| JP | 11-149538 A | 6/1999 |
| JP | 11-219420 A | 8/1999 |
| JP | 11-220319 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2005-229474 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-148948 A | 5/2000 |
| JP | 2000-172812 A | 6/2000 |
| JP | 2000-510271 A | 8/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 3075400 U | 11/2000 |
| JP | 2001-028036 A | 1/2001 |
| JP | 2007-18067 A | 1/2001 |
| JP | 2001-043340 A | 2/2001 |
| JP | 2001-66990 A | 3/2001 |
| JP | 2001-505682 A | 4/2001 |
| JP | 2001-168628 A | 6/2001 |
| JP | 2001-240046 A | 9/2001 |
| JP | 2001-256457 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-344574 A | 12/2001 |
| JP | 2001-351084 A | 12/2001 |
| JP | 2001-352176 A | 12/2001 |
| JP | 2002-024776 A | 1/2002 |
| JP | 2002-042076 A | 2/2002 |
| JP | 2002-063557 A | 2/2002 |
| JP | 2002-505645 A | 2/2002 |
| JP | 2002-76750 A | 3/2002 |

| | | |
|---|---|---|
| JP | 2002-150245 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-522849 A | 7/2002 |
| JP | 2002-230128 A | 8/2002 |
| JP | 2002-252117 A | 9/2002 |
| JP | 2002-298109 A | 10/2002 |
| JP | 2002-319008 A | 10/2002 |
| JP | 2002-362613 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-030612 A | 1/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-187207 A | 7/2003 |
| JP | 2003-187211 A | 7/2003 |
| JP | 2003-188338 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-288560 A | 10/2003 |
| JP | 2003-309418 A | 10/2003 |
| JP | 2003-332820 A | 11/2003 |
| JP | 2004-082775 A | 3/2004 |
| JP | 2004-88218 A | 3/2004 |
| JP | 2004-096566 A | 3/2004 |
| JP | 2004-253858 A | 9/2004 |
| JP | 2004-287767 A | 10/2004 |
| JP | 2004-297249 A | 10/2004 |
| JP | 2004-297681 A | 10/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-124061 A | 5/2005 |
| JP | 2005-136528 A | 5/2005 |
| JP | 2005-165839 A | 6/2005 |
| JP | 2005-167327 A | 6/2005 |
| JP | 2005-190417 A | 7/2005 |
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-275870 A | 10/2005 |
| JP | 2005-295135 A | 10/2005 |
| JP | 2005-311205 A | 11/2005 |
| JP | 2005-321305 A | 11/2005 |
| JP | 2005-335755 A | 12/2005 |
| JP | 2005-346820 A | 12/2005 |
| JP | 2005-352858 A | 12/2005 |
| JP | 2006-031766 A | 2/2006 |
| JP | 2006-39902 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-148518 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-270212 A | 10/2006 |
| JP | 2006-302219 A | 11/2006 |
| JP | 2006-309401 A | 11/2006 |
| JP | 2007-043535 A | 2/2007 |
| JP | 2007-65822 A | 3/2007 |
| JP | 2007-122542 A | 5/2007 |
| JP | 2007-150868 A | 6/2007 |
| JP | 2008-197714 A | 8/2008 |
| JP | 11-175678 A | 1/2009 |
| NL | 9100176 A | 3/1992 |
| NL | 9100347 A | 3/1992 |
| WO | 00/10122 A2 | 2/2000 |
| WO | 03/079305 A1 | 9/2003 |
| WO | WO 03079305 A1 * | 9/2003 |
| WO | 2004/036772 A1 | 4/2004 |
| WO | 2004/070879 A | 8/2004 |
| WO | 2004/072892 A1 | 8/2004 |
| WO | 2005/073937 A | 8/2005 |
| WO | 2005/115849 A1 | 12/2005 |
| WO | 2006/045682 A | 5/2006 |
| WO | 2007/083574 A1 | 7/2007 |
| WO | 2007/119304 A1 | 10/2007 |
| WO | 2008/081699 A1 | 7/2008 |

OTHER PUBLICATIONS

English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.

Official Communication issued in corresponding European Patent Application No. 08790581.6, mailed on Jul. 20, 2010.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags")", RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official Communications issued in corresponding Japanese Patent Application No. 2009-520589, mailed on Jul. 2, 2009.

* cited by examiner

FIG. 12A
TOP SURFACE

FIG. 12B
BOTTOM SURFACE

WIRELESS IC DEVICE

BACKGROUND OF THE INVENTION

1. Field of the Invention

The present invention relates to wireless IC devices and, in particular, to a wireless IC device including a wireless IC chip for use in an RFID (Radio Frequency Identification) system.

2. Description of the Related Art

RFID systems for transmitting information have recently been developed as a management system of goods. In such an RFID system, a reader/writer generating an induction electromagnetic field communicates in a contactless fashion with an IC chip (also referred to as an IC tag or a wireless IC chip) storing predetermined information attached to goods or a container.

As disclosed in Japanese Unexamined Patent Application Publication No. 2005-244778, a wireless tag known as a wireless IC device includes an IC chip mounted thereon. The wireless tag includes a dipole antenna (including a pair of main antenna elements and a matching unit) on a piezoelectric substrate and a tag IC electrically connected to ends of the dipole antenna. The matching unit, arranged between the tag IC and the main antenna elements, has a function of matching impedances between the tag IC and the main antenna elements.

The wireless tag has a problem discussed below. When the tag IC is electrically connected to the dipole antenna, a connection terminal of a small tag IC needs to be accurately positioned with respect to the dipole antenna and then mounted. A high precision mounting apparatus is thus required to avoid connection failures. Matching units, each occupying a large area, need to be arranged for the pair of main antenna elements in a manner such that the matching units do not overlap the antennas. The size of the wireless tag may be increased.

SUMMARY OF THE INVENTION

To overcome the problems described above, preferred embodiments of the present invention provide a miniaturized wireless IC device without the need for high precision mounting and that is appropriate for use in an RFID system.

A wireless IC device according to a preferred embodiment of the present invention includes a wireless IC chip having input and output terminals arranged to process transmission and reception signals, a feeder circuit board including a feeder circuit, the feeder circuit including at least one of a resonator circuit and a matching circuit, the feeder circuit including a first coupler and a second coupler, each coupler including an inductance element, and a first radiation plate including a first mount having the feeder circuit board mounted thereon, and a second radiation plate including a second mount having the feeder circuit board mounted thereon, each radiation plate being made of a metal. An electromagnetic coupler module having the feeder circuit board and the wireless IC chip mounted on the feeder circuit board is arranged with the input and output terminals of the wireless IC chip electrically connected to the feeder circuit. The first coupler is electromagnetically coupled with the first mount and the second coupler is electromagnetically mounted with the second mount. The wireless IC chip is operated by the first and second couplers in response to a signal received by the first and second radiation plates, and a response signal from the wireless IC chip is radiated to the outside from the first and second radiation plates via the first and second couplers.

In the wireless IC device, the first and second radiation plates include the first and second mounts arranged to mount the feeder circuit board thereon. The feeder circuit including the first and second couplers electromagnetically coupled with the first and second mounts performs impedance matching between the wireless IC chip and the first and second radiation plate and/or sets a resonance frequency of a signal. The wireless IC chip is not connected to the large radiation plate, but is electrically connected to and mounted on the small feeder circuit board. Thus, the mounting of the wireless IC chip is facilitated. The feeder circuit is not directly electrically connected to the first and second radiation plates, and the first and second couplers are electromagnetically coupled with the first and second mounts. The accuracy level required when the feeder circuit board is mounted on the radiation plate is reduced. Since a single feeder circuit is used, the feeder circuit board can be miniaturized. Since the feeder circuit is not directly connected to the radiation plate, the wireless IC chip is prevented from being broken even if an electrostatic charge enters via the radiation plate.

An operating frequency of the wireless IC chip is determined by the feeder circuit (resonator circuit) arranged on the feeder circuit board, and does not depend on the length and size of the first and second mounts where the first and second radiation plates are coupled with the feeder circuit (resonator circuit). Operation error does not occur even if the mounting position of the feeder circuit board with respect to the first and second radiation plates is deviated to some degree on the feeder circuit board. The required mounting accuracy is thus reduced.

Moreover, the wireless IC chip may have an information rewritable function in addition to the function of storing a variety of information related to the goods to which the wireless IC device is attached, and further may have an information processing function other than the function of the RFID system.

In accordance with preferred embodiments of the present invention, the electromagnetic coupler module is constructed by arranging the feeder circuit, including the first coupler and the second coupler, on the feeder circuit board, and mounting the wireless IC chip on the feeder circuit board. The first and second couplers are thus electromagnetically coupled with the first and second mounts on the first and second radiation plates. This arrangement eliminates the need for mounting the wireless IC chip and the feeder circuit board with high accuracy, and the wireless IC device can be miniaturized.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 12A and 12B illustrate the electromagnetic coupler module of the seventh preferred embodiment, wherein FIG. 12A is a plan view of the module and FIG. 12B is a bottom view of the module.

DETAILED DESCRIPTION OF PREFERRED EMBODIMENTS

Preferred embodiments of a wireless IC device of the present invention are described with reference to the accompanying drawings. In the drawings, similar elements are designated with the same reference numerals and the discussion thereof is omitted.

First Preferred Embodiment

Figure 1:
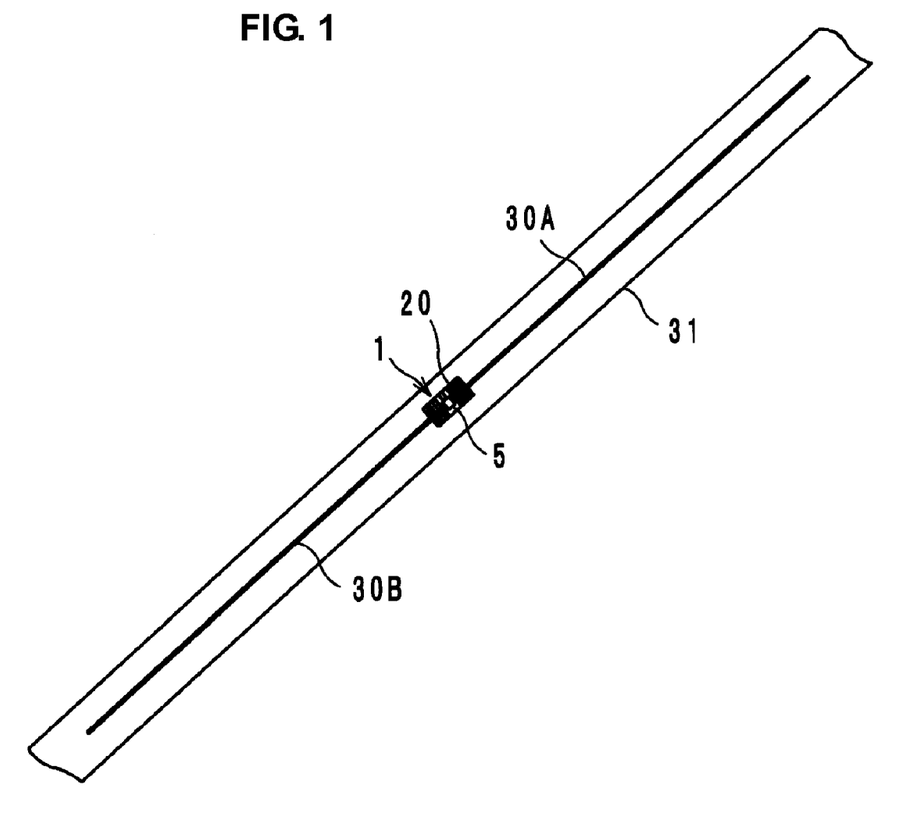
FIG. 1 is a perspective view illustrating a wireless IC device in accordance with a first preferred embodiment of the present invention.
Figure 2:
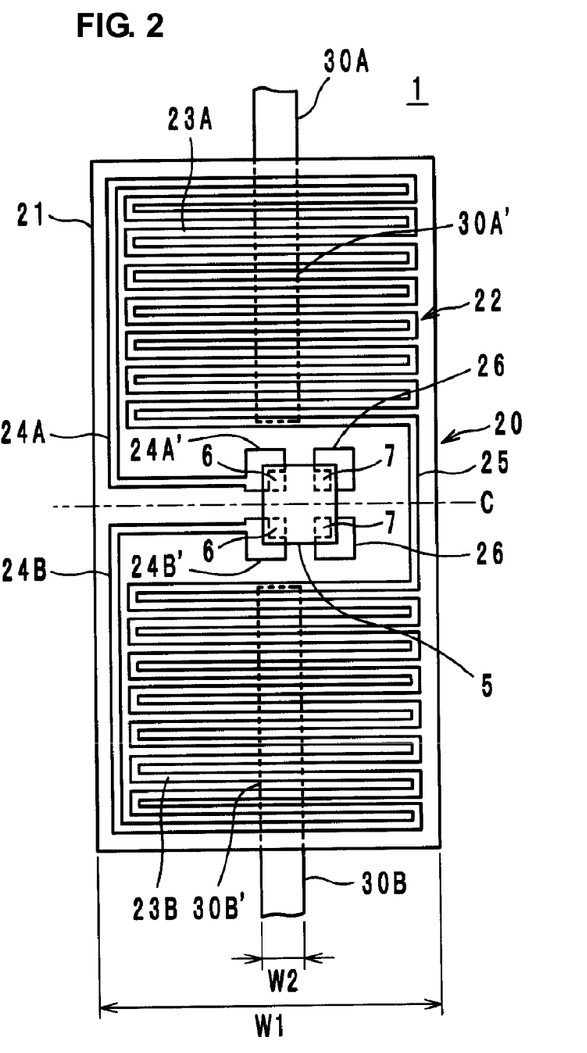
FIG. 2 is a plan view illustrating an electromagnetic coupler module in accordance with the first preferred embodiment of the present invention.
Figure 3:
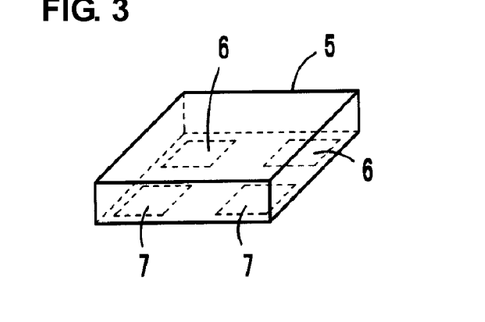
FIG. 3 is a perspective view illustrating a wireless IC chip.

FIGS. 1, 2 and 3 illustrate a first preferred embodiment of the wireless IC device. The wireless IC device includes a wireless IC chip 5 arranged to process transmission and reception signals at predetermined frequencies, a feeder circuit board 20 having a feeder circuit 22 including a first coupler 23A and a second coupler 23B and inductance elements including line electrodes 24A and 24B, and a first radiation plate 30A and a second radiation plate 30B defining an antenna and arranged on a board 31 preferably made of an PET film, for example. The wireless IC chip 5 is mounted on the feeder circuit board 20 and both the wireless IC chip 5 and the feeder circuit board 20 define an electromagnetic coupler module 1.

The first and second radiation plates 30A and 30B are preferably metal strips that are linearly arranged on the flexible film board 31, and function as a dipole antenna. Ends of each of the first and second radiation plates 30A and 30B are provided with first and second mounts 30A' and 30B' which respectively support a feeder circuit board 20. The feeder circuit board 20 is glued on the first and second mounts 30A' and 30B' using an adhesive agent (not shown), and the first and second mounts 30A' and 30B' are electromagnetically coupled with first and second couplers 23A and 23B as described below.

The feeder circuit board 20 includes line electrodes 24A and 24B meandering on the board 21 preferably made of a PET film, for example. Ends of the line electrodes 24A and 24B respectively define connection electrodes 24A' and 24B', and the other ends thereof are shortcircuited to each other via an electrode 25. Furthermore, floating electrodes 26 are provided on the flexible film board 21.

The line electrodes 24A and 24B and the radiation plates 30A and 30B are preferably produced by gluing boards 21 and 31 on a metal thin film, made of an electrically conductive material, such as aluminum foil or copper foil, for example, or by forming a metal plate of Al, Cu, Ag, or other suitable metal, for example, or an electrically conductive paste on the boards 21 and 31.

The wireless IC chip 5 includes a clock circuit, a logic circuit, and a memory circuit, and stores necessary information. As illustrated in FIG. 3, input and output terminal electrodes 6 and mounting terminal electrodes 7 are arranged on the bottom surface of the wireless IC chip 5. In the wireless IC chip 5, the input and output terminal electrodes 6 are electrically connected to the connection electrodes 24A' and 24B' of the line electrodes 24A and 24B via metal bumps preferably made of solder or Au, for example. The mounting terminal electrodes 7 are electrically connected to electrodes 26 via metal bumps.

The wireless IC device is glued on or otherwise affixed to a container of goods as a handling target of the RFID system. The wireless IC chip 5 communicates with a reader/writer via the feeder circuit 22 and the first and second radiation plates 30A and 30B using a high frequency signal on the UHF frequency band. More specifically, the wireless IC chip 5 is operated by the feeder circuit 22 in response to the high frequency signal received by the first and second radiation plates 30A and 30B. A response signal from the wireless IC chip 5 is then emitted via the feeder circuit 22 from the radiation plates 30A and 30B.

The first mount 30A' of the first radiation plate 30A is electromagnetically coupled with the first coupler 23A and the second mount 30B' of the second radiation plate 30B is electromagnetically coupled with the second coupler 23B. Each of the line electrodes 24A and 24B defines a resonator circuit with the inductance thereof and a capacitance provided by the lines thereof. The resonator circuit is electromagnetically coupled with each of the first mount 30A' and the second mount 30B'. The resonator circuit performs impedance matching and determines a resonance frequency of a signal between the wireless IC chip 5 and each of the radiation plates 30A and 30B.

Figure 4:
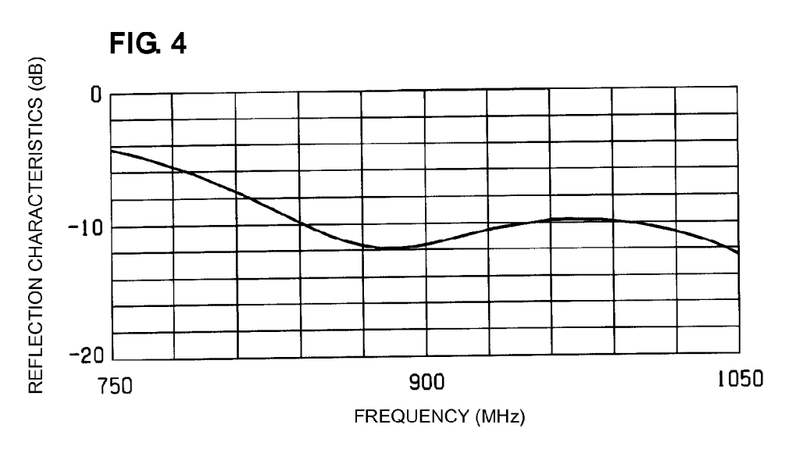
FIG. 4 is a graph representing reflection characteristics of the first preferred embodiment of the present invention.

FIG. 4 illustrates reflection characteristics of the wireless IC device. Excellent reflection characteristics equal to or greater than about 10 dB are obtained in at approximately 900 MHz, for example.

In the wireless IC device, the infinitesimal wireless IC chip 5 is electrically connected to and mounted on a small feeder circuit board 20. The mounting of the wireless IC chip 5 is easy. The feeder electrode 22 is not directly electrically connected to the first and second radiation plates 30A and 30B, and the first and second couplers 23A and 23B are electromagnetically coupled with the first and second mounts 30A' and 30B'. The required mounting accuracy with which the feeder circuit board 20 is mounted on (glued on with an adhesive agent) the first and second radiation plates 30A and 30B is reduced. The feeder electrode 22 can also be miniaturized.

The operating frequency of the wireless IC device is determined by the resonator circuit included in the feeder circuit 22 and thus does not depend on the length of the radiation plates 30A and 30B. Even if the feeder circuit board 20 is mounted on the first and second mounts 30A' and 30B' with some degree of deviation, no operational malfunction occurs. In this sense, as well, the required mounting accuracy is reduced.

Furthermore, since the feeder circuit 22 is not directly conductively connected to the first and second radiation plates 30A and 30B, the wireless IC chip 5 is prevented from being damaged by an electrostatic charge as an energy wave equal to or less than about 200 MHz entering via the radiation plates 30A and 30B.

In accordance with the first preferred embodiment, a width W1 of the first coupler 23A and the second coupler 23B is preferably set to be greater than a width W2 of the first mount 30A' and the second mount 30B'. In this manner, the first and second mounts 30A' and 30B' are easily aligned with the couplers 23A and 23B. The required mounting accuracy of the feeder circuit board 20 with respect to the radiation plates 30A and 30B is further reduced. This is also true of each of the preferred embodiments described below.

Since the first coupler 23A and the first mount 30A' overlap each other in plan view and the second coupler 23B and the second mount 30B' overlap each other in plan view, the wireless IC device is further miniaturized. Furthermore, the first coupler 23A and the first mount 30A' substantially perpendicularly cross each other and the second coupler 23B and the second mount 30B' substantially perpendicularly cross each other. Magnetic fields generated at the couplers 23A and 23B and at the mounts 30A' and 30B' are substantially perpendicular to each other. With this arrangement, the magnetic fields are easily coupled with each other. A power transfer efficiency between the feeder circuit 22 and each of the radiation plates 30A and 30B is increased.

The first coupler 23A and the second coupler 23B include the line electrodes 24A and 24B that are arranged to be axisymmetrical with each other with respect to an axis C centered on the wireless IC chip 5. In this manner, the first and second mounts 30A' and 30B' are coupled with the feeder circuit 22 at the same constant, and the first radiation plate 30A and the second radiation plate 30B can have the same or substantially the same radiation characteristics and the same or substantially the same directivity characteristics. The same is true of the preferred embodiments described below.

Since the first coupler 23A and the second coupler 23B are defined by the meandering line electrodes 24A and 24B, the feeder circuit 22 has a compact arrangement. The feeder circuit board 20 is also miniaturized.

Second Preferred Embodiment

Figure 5:
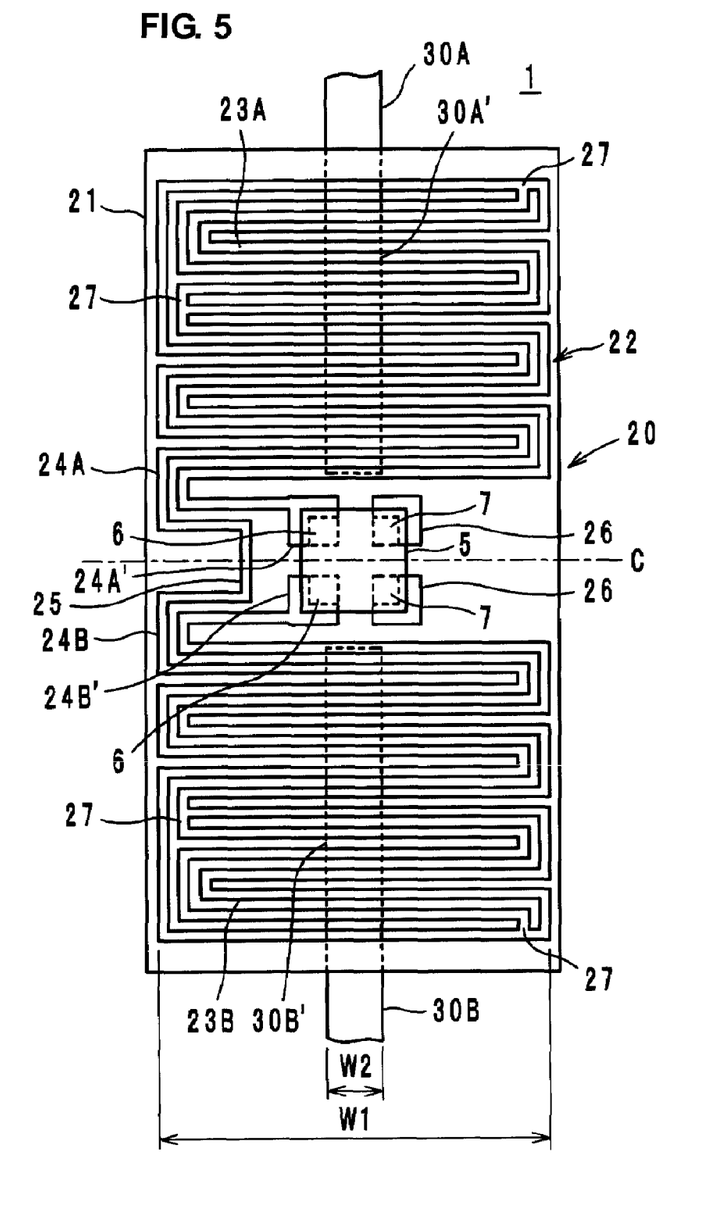
FIG. 5 is a plan view illustrating the electromagnetic coupler module in a wireless IC device in accordance with a second preferred embodiment of the present invention.

FIG. 5 illustrates a wireless IC device of a second preferred embodiment of the present invention. The wireless IC device includes the meandering line electrodes 24A and 24B defining the first coupler 23A and the second coupler 23B of the feeder circuit 22 arranged on the feeder circuit board 20. The line electrodes 24A and 24B are partially branched (branch points are denoted by reference numerals 27). The remainder of the structure of the second preferred embodiment is substantially the same as the structure of the first preferred embodiment of the present invention.

The operation and advantages of the second preferred embodiment are substantially the same as those of the first preferred embodiment. In particular, the line electrodes 24A and 24B are branched, and the branched portions have different lengths. Thus, the first coupler 23A and the second coupler 23B provide a plurality of different frequencies. Frequencies of peak gains of the first and second radiation plates 30A and 30B functioning as the antennas are varied. Wideband gain characteristics are produced accordingly. The remainder of the operation and advantages are substantially the same as the operation and advantages of the first preferred embodiment of the present invention.

Third Preferred Embodiment

Figure 6:
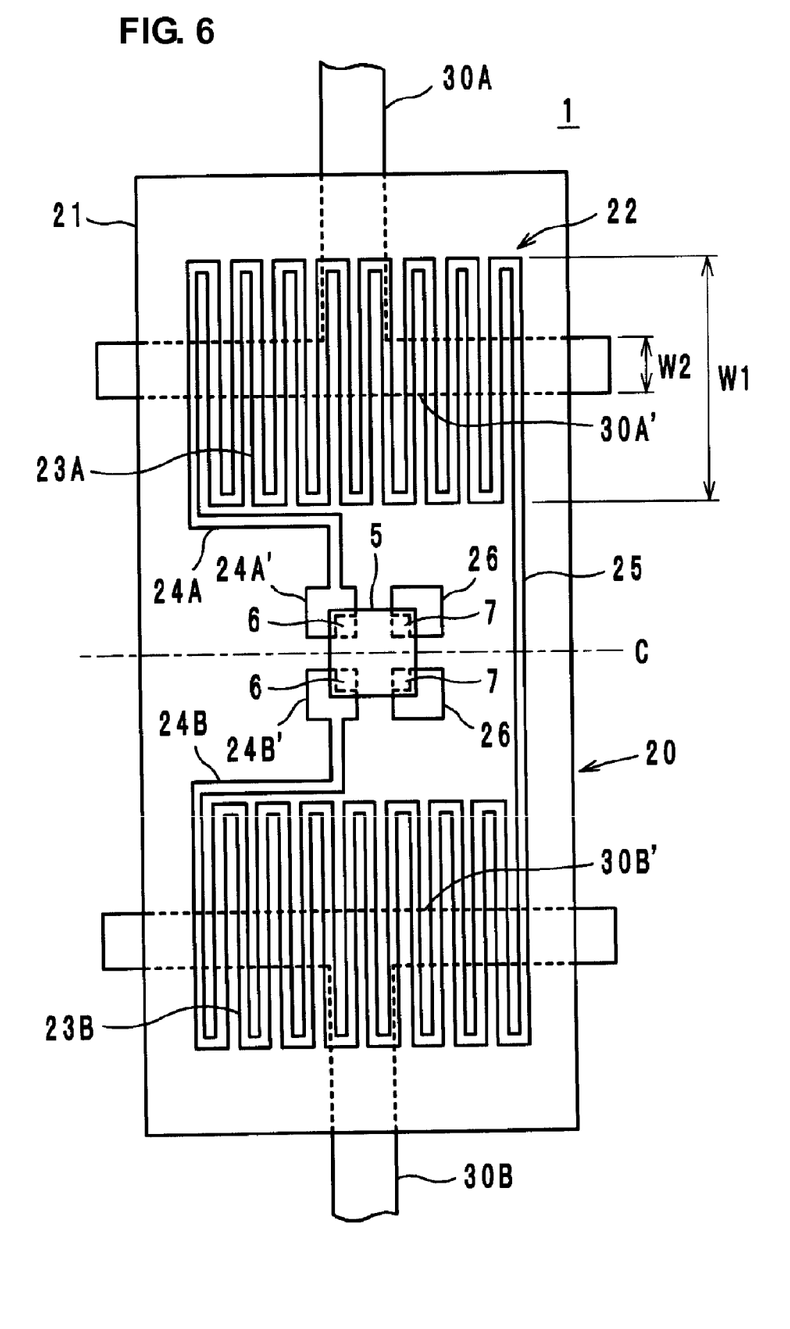
FIG. 6 is a plan view illustrating the electromagnetic coupler module in a wireless IC device in accordance with a third preferred embodiment of the present invention.

FIG. 6 illustrates a wireless IC device of a third preferred embodiment of the present invention. The wireless IC device includes the meandering line electrodes 24A and 24B including the first coupler 23A and the second coupler 23B of the feeder circuit 22 arranged on the feeder circuit board 20. The line electrodes 24A and 24B are bent to extend and meander within a rectangular shape along the longitudinal direction of the board 21. The first mount 30A' of the first radiation plate 30A and the second mount 30B' of the second radiation plate 30B have a substantial T shape, and respectively substantially perpendicularly cross the first coupler 23A and the second coupler 23B in plan view.

The remainder of the structure of the third preferred embodiment is substantially the same as that of first preferred embodiment, and the operation and advantages of the third preferred embodiment are substantially the same as the operation and advantages of the first preferred embodiment of the present invention.

Fourth Preferred Embodiment

Figure 7:
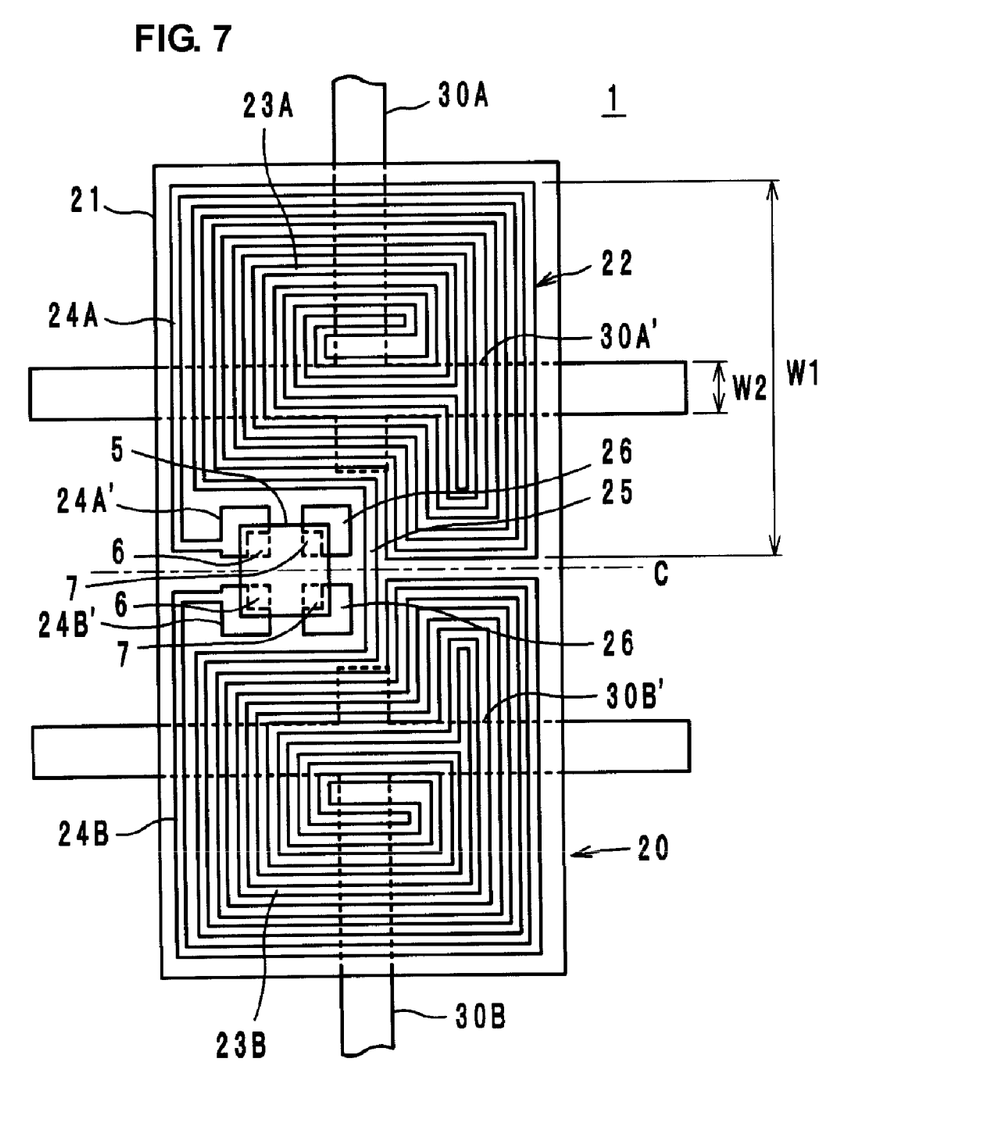
FIG. 7 is a plan view illustrating the electromagnetic coupler module in a wireless IC device in accordance with a fourth preferred embodiment of the present invention.

FIG. 7 illustrates a wireless IC device of a fourth preferred embodiment of the present invention. The wireless IC device includes the spiraling line electrodes 24A and 24B defining the first coupler 23A and the second coupler 23B of the feeder circuit 22 arranged on the feeder circuit board 20. As in the third preferred embodiment, the first mount 30A' of the first radiation plate 30A and the second mount 30B' of the second radiation plate 30B have a substantial T shape.

The remainder of the structure of the fourth preferred embodiment is substantially the same as the structure of the first preferred embodiment. The operation and advantages of the fourth preferred embodiment are substantially the same as the operation and advantages of the first preferred embodiment. In particular, the first and second spiraling couplers 23A and 23B enables the feeder circuit 22 to be designed in a compact arrangement and the feeder circuit board 20 to be miniaturized. Since areas in which the first and second couplers 23A and 23B substantially perpendicularly cross the first and second mounts 30A' and 30B' are increased, the degree of coupling between the magnetic fields generated by the couplers 23A and 23B and the mounts 30A' and 30B' is increased.

Fifth Preferred Embodiment

Figure 8:
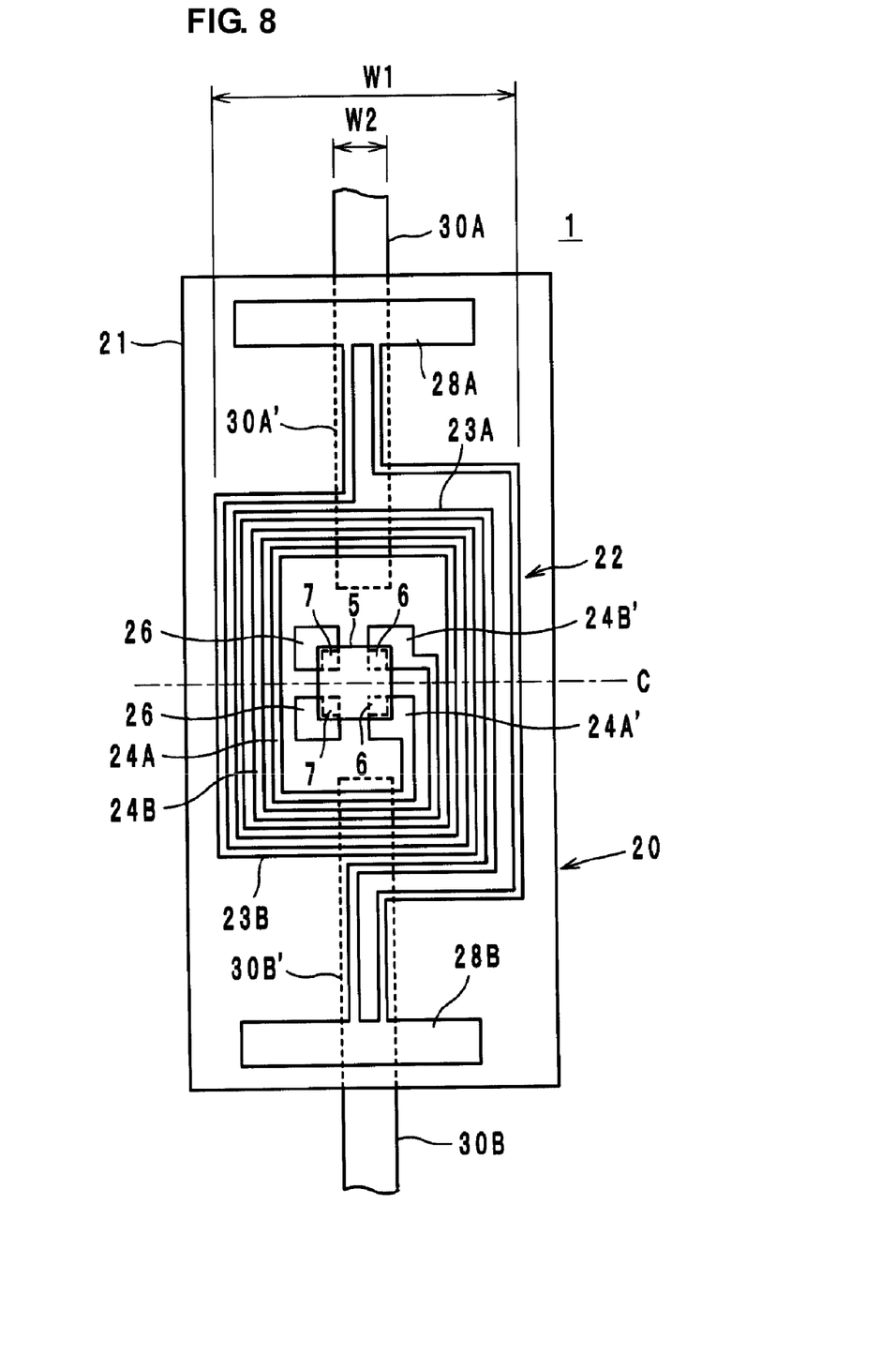
FIG. 8 is a plan view illustrating the electromagnetic coupler module in a wireless IC device in accordance with a fifth preferred embodiment of the present invention.

FIG. 8 illustrates a wireless IC device of a fifth preferred embodiment of the present invention. The wireless IC device includes the line electrodes 24A and 24B defining doubly spiraling the feeder circuit 22 arranged on the feeder circuit board 20. The line electrodes 24A and 24B are folded back at electrodes 28A and 28B with the ends thereof shortcircuited to each other. The remainder of the structure of the fifth preferred embodiment is substantially the same as the structure of the first preferred embodiment, and the operation and advantages of the fifth preferred embodiment are substantially the same as the operation and advantages of the first preferred embodiment.

It is noted that the line lengths of the line electrodes 24A and 24B are different from one another by doubling spiraling the line electrodes 24A and 24B or by branching the line electrodes 24A and 24B at predetermined locations as discussed with reference to the second preferred embodiment. The resonance frequency of the feeder circuit 22 corresponds to the line length of the line electrodes 24A and 24B, and the relationship between the line length L and the wavelength $\lambda$ corresponding to the resonance frequency f is $L=\lambda/2$.

Even if the lengths of the line electrodes 24A and 24B are equal or substantially equal to each other, the resonance frequencies thereof can be made different by introducing a different line width or an inter-electrode capacitance. The inductance of each electrode can be varied by changing the width of the electrode. More specifically, as the width of the electrode increases, the inductance of the electrode increases. The inter-electrode capacitance can be varied by changing the spacing between the electrodes. More specifically, as the electrode spacing increases, the capacitance decreases. The resonance frequency can be fine-adjusted by changing the line width and/or the electrode spacing.

Sixth Preferred Embodiment

Figure 9:
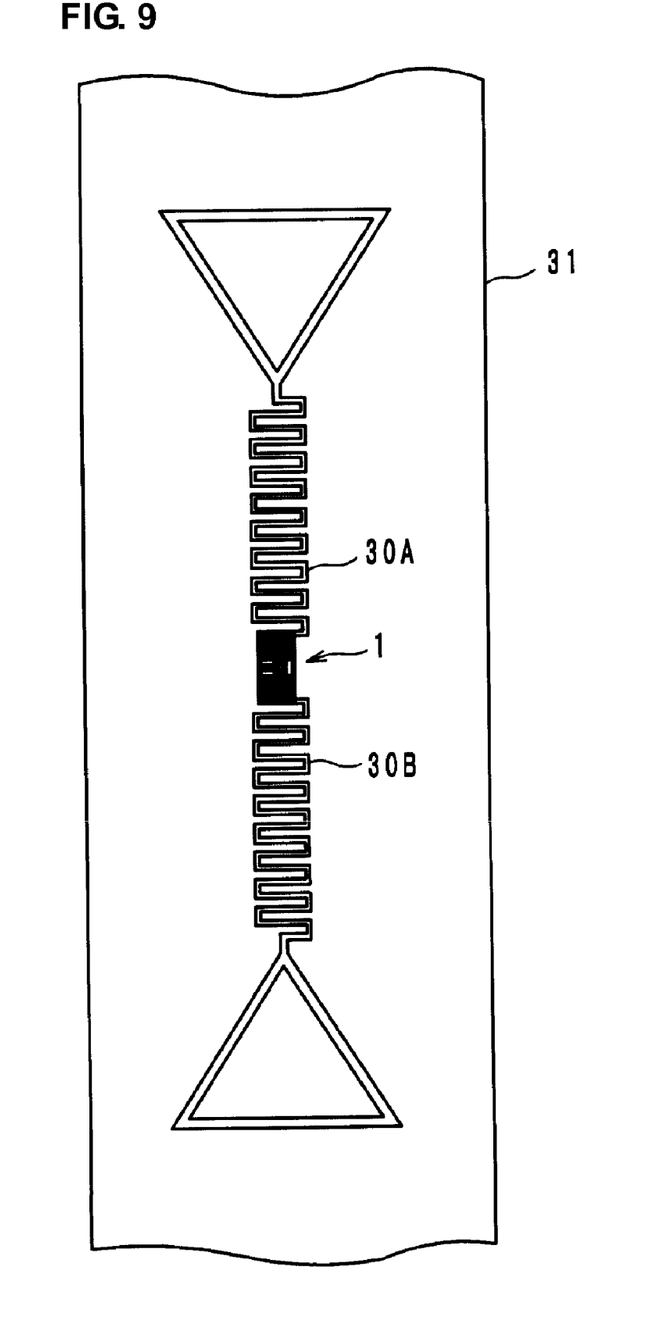
FIG. 9 is a plan view illustrating a wireless IC device in accordance with a sixth preferred embodiment of the present invention.
Figure 10:
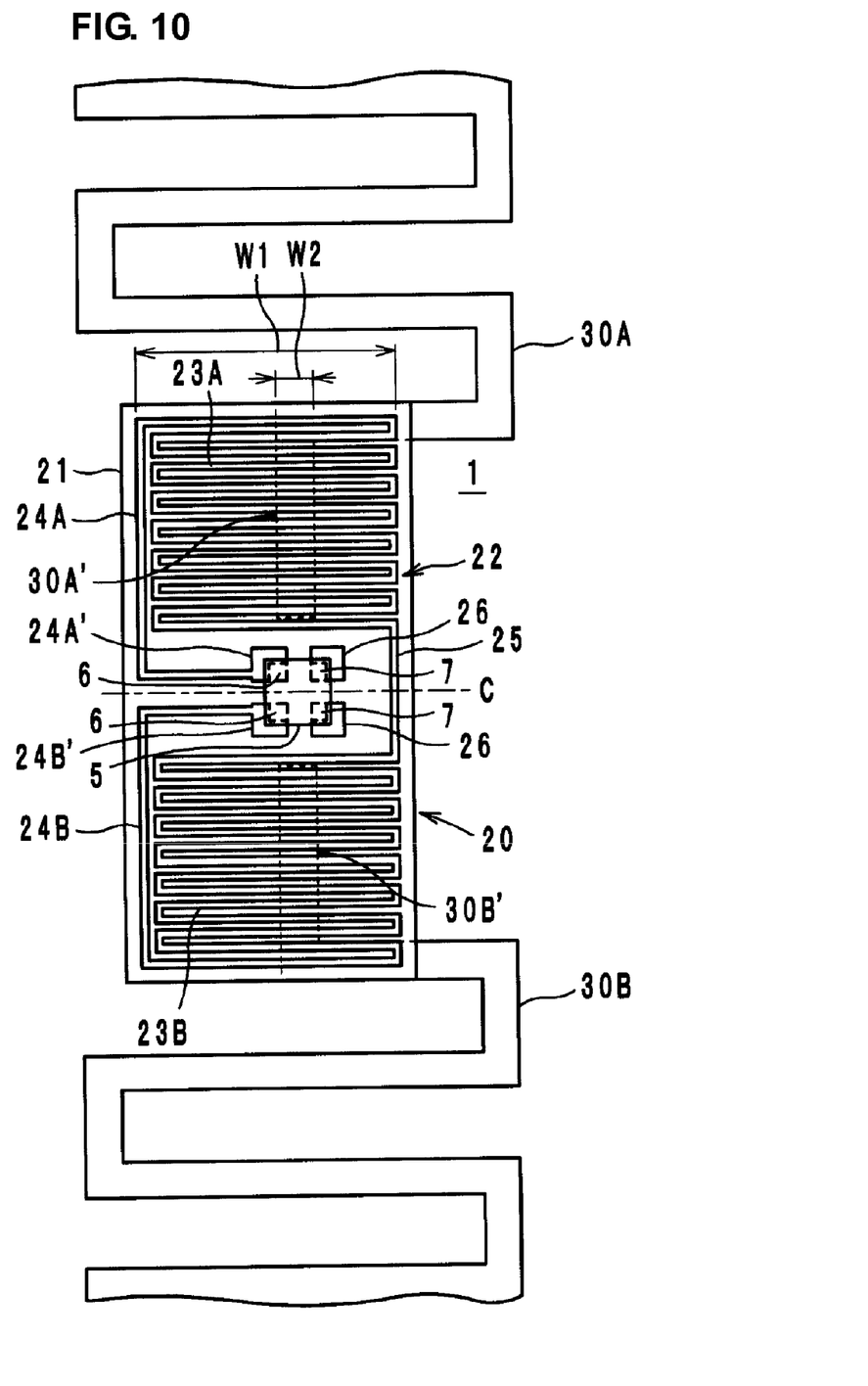
FIG. 10 is a plan view illustrating the electromagnetic coupler module of the sixth preferred embodiment of the present invention.

FIGS. 9 and 10 illustrate a wireless IC device of a sixth preferred embodiment of the present invention. As in the first through fifth preferred embodiments, the wireless IC device includes the electromagnetic coupler module 1 including the wireless IC chip 5 and the feeder circuit board 20. The first mount 30A' of the first radiation plate 30A is electromagnetically coupled with the first coupler 23A of the feeder circuit 22 and the second mount 30B' of the second radiation plate 30B is electromagnetically coupled with the second coupler 23B.

The feeder electrode 22 provided on the feeder circuit board 20 is substantially the same as that in the first preferred embodiment. The first and second radiation plates 30A and 30B are constructed of meandering metal strips on the flexible board 31. The first mount 30A' and the second mount 30B' provided on ends of the first and second radiation plates 30A and 30B overlap and cross the first coupler 23A and the second coupler 23B defined by the line electrodes 24A and 24B for electromagnetic coupling, and the other ends of each the first and second radiation plates 30A and 30B are terminated with closed loops.

The remainder of the structure of the sixth preferred embodiment is substantially the same as the structure of the first preferred embodiment. The operation and advantages of the sixth preferred embodiment substantially the same as the operation and advantages of the first preferred embodiment. In particular, the use of the first and second meandering radiation plates 30A and 30B enables the radiation plates 30A and 30B to have a compact arrangement.

Seventh Preferred Embodiment

Figure 11:
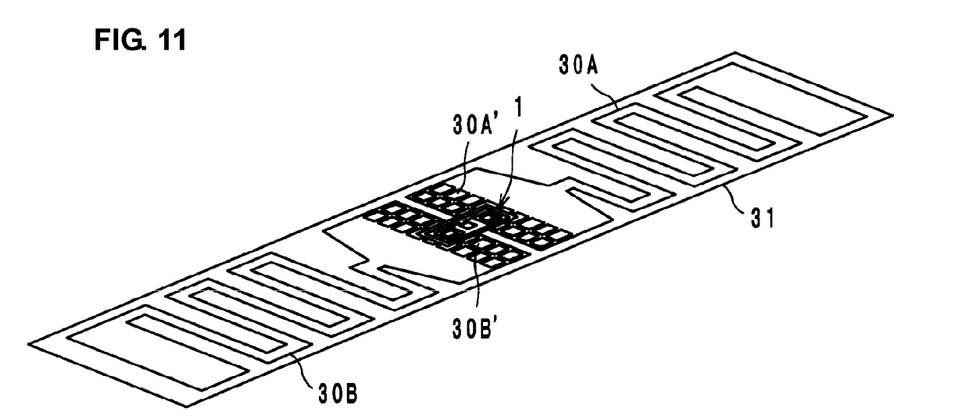
FIG. 11 is a perspective view illustrating a wireless IC device in accordance with a seventh preferred embodiment of the present invention.
Figure 12A:
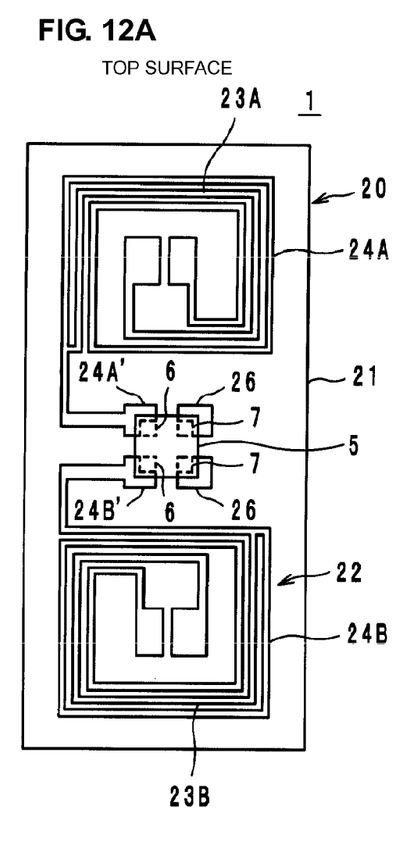
Figure 12B:
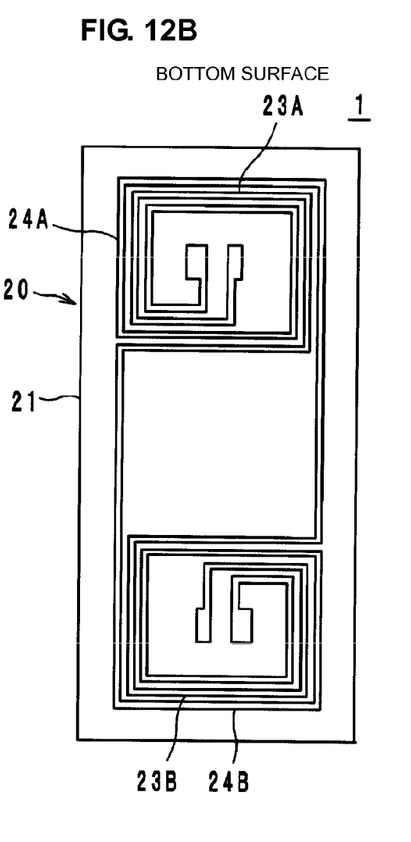

FIGS. 11, 12A and 12B illustrate a wireless IC device of a seventh preferred embodiment of the present invention. As in the first through sixth preferred embodiments, the wireless IC device includes the electromagnetic coupler module 1 including the wireless IC chip 5 and the feeder circuit board 20. The feeder electrode 22 is provided on the top surface and the bottom surface of the board 21 and the first and second mounts 30A' and 30B' arranged at ends of the first and second meandering radiation plates 30A and 30B are meshed.

As illustrated in FIGS. 12A and 12B, the first and second couplers 23A and 23B including the spiraling line electrodes 24A and 24B are arranged on the top surface of the board 21, and the first and second couplers 23A and 23B including the spiraling line electrodes 24A and 24B are arranged on the bottom surface of the board 21.

The first and second couplers 23A and 23B arranged on the top surface and the bottom surface of the board 21 are respectively electromagnetically coupled. The bottom surface of the flexible film board 21 is glued on the first and second mounts 30A' and 30B' of the first and second radiation plates 30A and 30B with an adhesive agent (note shown). The first coupler 23A is electromagnetically coupled with the first mount 30A', and the second coupler 23B is electromagnetically coupled with the second mount 30B'.

The operation and advantages of the seventh preferred embodiment are substantially the same as the operation and advantages of the first preferred embodiment. Since the first and second couplers 23A and 23B are arranged on both the top surface and the bottom surface, the design flexibility of the line electrodes 24A and 24B (inductance elements) defining the feeder circuit 22 is increased, and the feeder circuit 22 is thus miniaturized. Since the first and second mounts 30A' and 30B' of the first and second radiation plates 30A and 30B are meshed, the magnetic flux generated by the feeder circuit 22 passes through apertures of the mounts. A change (reduction) in the magnetic flux is reduced. Since more magnetic flux passes through the mounts 30A' and 30B', transfer efficiency of signal energy is increased.

In the seventh preferred embodiment, the line electrodes 24A and 24B of the first and second couplers 23A and 23B are arranged on the top and bottom surfaces of the flexible film board 21. One of the first and second couplers 23A and 23B may be arranged on both the top and bottom surfaces of the board 21. Furthermore, one of the first and second mounts 30A' and 30B' may be meshed.

In the wireless IC device, the width of the first coupler and the second coupler is preferably greater than the width of the first mount and the second mount. This arrangement facilitates the position alignment between the mount and the coupler. The required mounting accuracy of the feeder circuit board with respect to the mount is reduced.

The first coupler and the first mount may preferably partially overlap each other in plan view and the second coupler and the second mount may preferably partially overlap each other in plan view. With the two elements overlapping each other in plan view, the wireless IC device can be further miniaturized. If the two elements cross each other, the magnetic fields of the two elements are easily coupled and the transfer efficiency of power between the feeder circuit and the radiation plate is increased.

At least one of the first mount and the second mount may preferably be meshed. Since the magnetic flux generated by the feeder circuit passes through the apertures, a change (reduction) in the magnetic flux is reduced. Since more magnetic flux passes through the mounts, transfer efficiency of signal energy is increased.

At least one of the first coupler and the second coupler may preferably be arranged on both the top and bottom surfaces of the feeder circuit board. With the coupler arranged on both the top and bottom surfaces of the feeder circuit board, the design flexibility of the inductance element defining the feeder circuit is increased. The feeder circuit is thus miniaturized.

Furthermore, the first coupler and the second coupler may preferably be axisymmetrical to each other with respect to the center of the wireless IC chip. The first and second radiation plates are preferably coupled with the feeder circuit with the same constant. The first and second radiation plates can have the same radiation characteristics and the same directivity characteristics, for example.

Each of the first coupler and the second coupler may preferably be constructed of a continuous line electrode, or a line electrode meandering or spiraling, for example. The line electrode may be branched at a predetermined position. The meandering structure or the spiraling structure enables the feeder circuit to be produced so as to have a compact arrangement, thereby contributing to the miniaturization of the feeder circuit board. If the lengths of the line electrodes are varied, a plurality of resonance frequencies are provided. The frequencies of the peak gains of the first and second radiation plates functioning the antenna are varied, and wide-band gain characteristics are obtained.

The resonance frequency of the line electrode is determined by the line length thereof. Even if the line lengths of the line electrodes are different, the resonance frequencies of the line electrodes can be made different by providing different the inter-electrode capacitances, for example. More specifically, the inductance of the electrode is varied by changing the line width of the line electrode. The capacitance of the inter-electrode is varied by changing the electrode spacing.

The feeder circuit board may be a flexible board. Since the flexible board is typically thin, the wireless IC device may be produced in a low-profile structure.

The wireless IC device of the present invention is not limited to the above-described preferred embodiments, and a variety of modification may be implemented in the invention without departing from the scope of the invention.

The materials of the line electrodes 24A and 24B, the radiation plates 30A and 30B, and the boards 21 and 31 are described for exemplary purposes only. Any material can be used as long as the material has the required characteristics. The wireless IC chip 5 may be connected to the feeder circuit 22 through another process different from the one using the metal bump, for example.

As described above, preferred embodiments of the present invention are useful for the wireless IC device, and are particularly advantageous in that miniaturization is achieved without the need for high-precision mounting.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wireless IC device, comprising:
   a wireless IC chip including input and output terminals defining a first terminal and a second terminal and arranged to process transmission and reception signals;
   a feeder circuit board including a feeder circuit, the feeder circuit including at least one of a resonator circuit and a matching circuit, the feeder circuit including a first coupler and a second coupler, each coupler including an inductance element; and
   a first radiation plate including a first mount having the feeder circuit board mounted thereon, and a second radiation plate including a second mount having the feeder circuit board mounted thereon, each of the first and second radiation plates being made of a metal; wherein
   an electromagnetic coupler module having the feeder circuit board and the wireless IC chip mounted on the feeder circuit board is arranged with the first and second terminals of the wireless IC chip electrically connected to the first and second couplers, respectively;
   the first coupler is electromagnetically coupled with the first mount and the second coupler is electromagnetically coupled with the second mount;
   the wireless IC chip is arranged to be operated by the first and second couplers in response to a signal received by the first and second radiation plates, and a response signal from the wireless IC chip is radiated to the outside from the first and second radiation plates via the first and second couplers;
   the first coupler and the second coupler are arranged so as to overlap the first mount and the second mount, respectively, in a direction perpendicular to a main surface of the first and second radiation plates and a main surface of the electromagnetic coupler module;
   each of the first mount and the second mount includes first and second opposed edges;
   the first coupler is arranged such that the first coupler extends outward from the first edge of the first mount and extends outward from the second edge of the first mount along an entire length of the first coupler; and
   the second coupler is arranged such that the second coupler extends outward from the first edge of the second mount and extends outward from the second edge of the second mount along an entire length of the second coupler; and
   each of the first coupler and the second coupler extends a plurality of times across the first and second edges of the first and second mounts along an entire length of the first coupler and the second coupler.

2. The wireless IC device according to claim 1, wherein the first coupler and the first mount substantially perpendicularly cross each other in plan view and the second coupler and the second mount substantially perpendicularly cross each other in plan view.

3. The wireless IC device according to claim 1, wherein at least one of the first coupler and the second coupler is arranged on a top surface and a bottom surface of the feeder circuit board.

4. The wireless IC device according to claim 1, wherein the first coupler and the second coupler include line electrodes that are axisymmetrical to each other with respect to the wireless IC chip.

5. The wireless IC device according to claim 1, wherein each of the first coupler and the second coupler includes a continuous line electrode.

6. The wireless IC device according to claim 1, wherein each of the first coupler and the second coupler includes a meandering line electrode.

7. The wireless IC device according to claim 1, wherein each of the first coupler and the second coupler includes a spiraling line electrode.

8. The wireless IC device according to claim 1, wherein each of the first coupler and the second coupler includes a line electrode including a branch at a predetermined location.

9. The wireless IC device according to claim 1, wherein the feeder circuit board includes a flexible board.

10. A wireless IC device, comprising:
    a wireless IC chip including input and output terminals defining a first terminal and a second terminal and arranged to process transmission and reception signals;
    a feeder circuit board including a feeder circuit, the feeder circuit including at least one of a resonator circuit and a matching circuit, the feeder circuit including a first coupler and a second coupler, each of the first coupler and the second coupler including an inductance element; and
    a first radiation plate including a first mount having the feeder circuit board mounted thereon, and a second radiation plate including a second mount having the feeder circuit board mounted thereon, each of the first and second radiation plates being made of a metal; wherein
    an electromagnetic coupler module having the feeder circuit board and the wireless IC chip mounted on the feeder circuit board is arranged with the first and second terminals of the wireless IC chip electrically connected to the first and second couplers, respectively;
    the first coupler is electromagnetically coupled with the first mount and the second coupler is electromagnetically coupled with the second mount;

the wireless IC chip is arranged to be operated by the first and second couplers in response to a signal received by the first and second radiation plates, and a response signal from the wireless IC chip is radiated to the outside from the first and second radiation plates via the first and second couplers;

the first coupler and the second coupler are arranged so as to overlap the first mount and the second mount, respectively, in a direction perpendicular to a main surface of the first and second radiation plates and a main surface of the electromagnetic coupler module; and each of the first mount and the second mount includes a meshed portion including a plurality of apertures extending therethrough.

11. The wireless IC device according to claim 10, wherein a width of the first coupler and the second coupler is greater than a width of the first mount and the second mount.

12. The wireless IC device according to claim 10, wherein the first coupler and the first mount partially overlap each other in plan view and the second coupler and the second mount partially overlap each other in plan view.

13. The wireless IC device according to claim 10, wherein the first coupler and the first mount substantially perpendicularly cross each other in plan view and the second coupler and the second mount substantially perpendicularly cross each other in plan view.

14. The wireless IC device according to claim 10, wherein at least one of the first coupler and the second coupler is arranged on a top surface and a bottom surface of the feeder circuit board.

15. The wireless IC device according to claim 10, wherein the first coupler and the second coupler include line electrodes that are axisymmetrical to each other with respect to the wireless IC chip.

16. The wireless IC device according to claim 10, wherein each of the first coupler and the second coupler includes a continuous line electrode.

17. The wireless IC device according to claim 10, wherein each of the first coupler and the second coupler includes a meandering line electrode.

18. The wireless IC device according to claim 10, wherein each of the first coupler and the second coupler includes a spiraling line electrode.

19. The wireless IC device according to claim 10, wherein each of the first coupler and the second coupler includes a line electrode including a branch at a predetermined location.

20. The wireless IC device according to claim 10, wherein the feeder circuit board includes a flexible board.

* * * * *